June 4, 1935.　　A. G. BELDEN ET AL　　2,003,334
CALIPER CONTROLLED GRINDING MACHINE
Filed July 25, 1931　　4 Sheets-Sheet 3
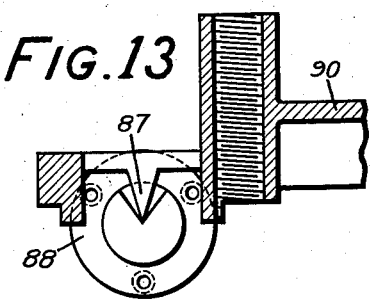
FIG.13
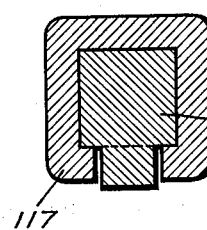
FIG.15
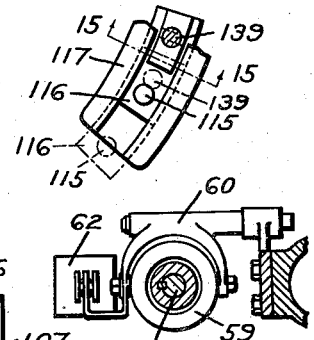
FIG.14
FIG.16
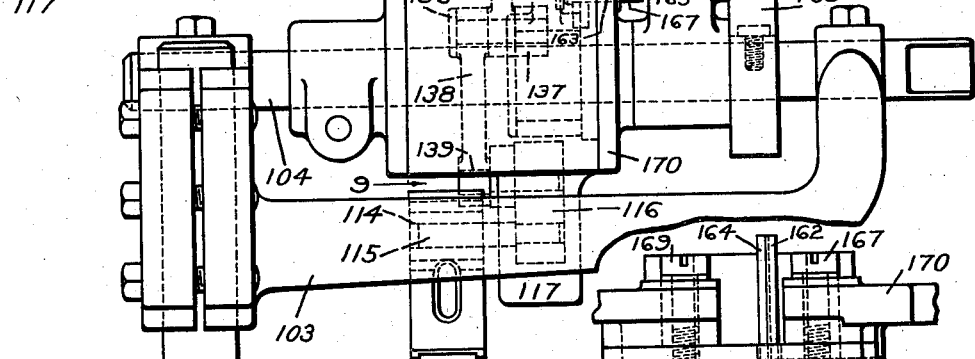
FIG.5　FIG.7
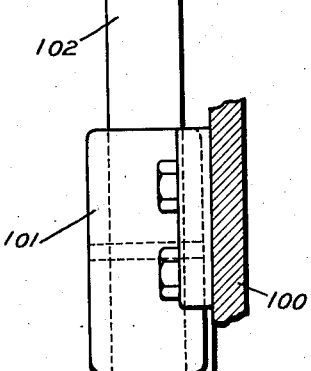
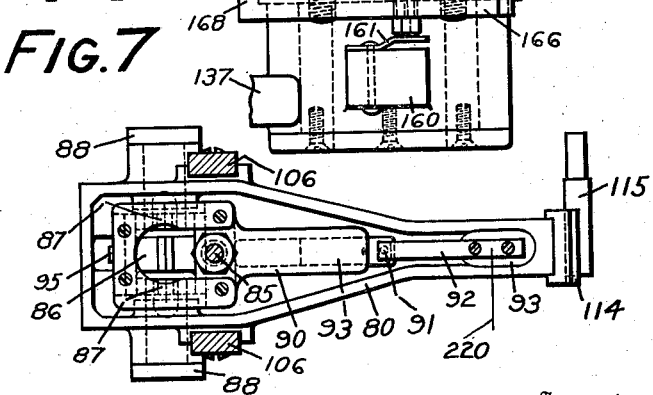
FIG.6
Inventors
ALBERT G. BELDEN
RAYMOND A. COLE
By Clayton L. Jenks
Attorney
WITNESSES
Franklin E. Johnson
Harold W. Eaton

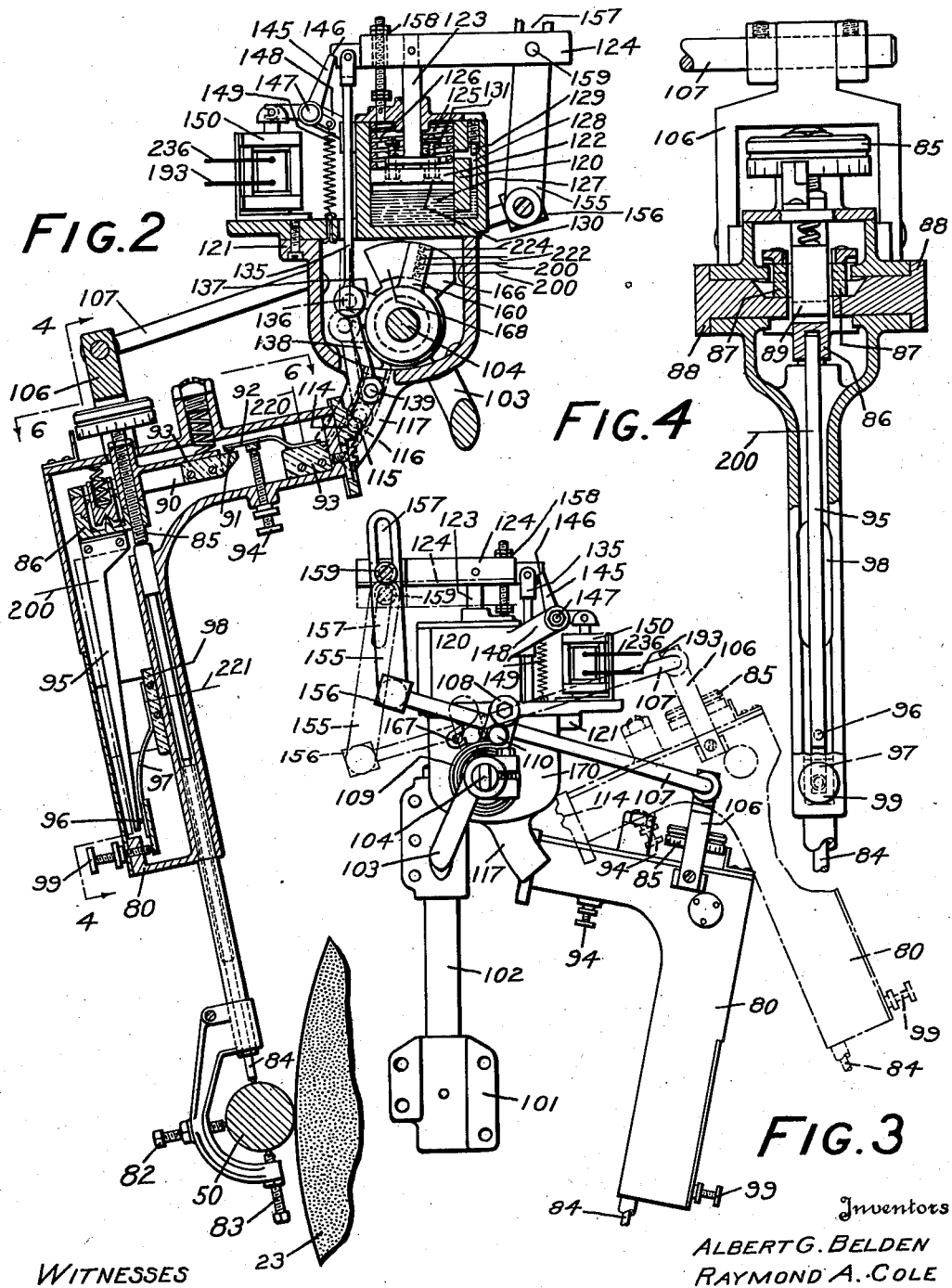

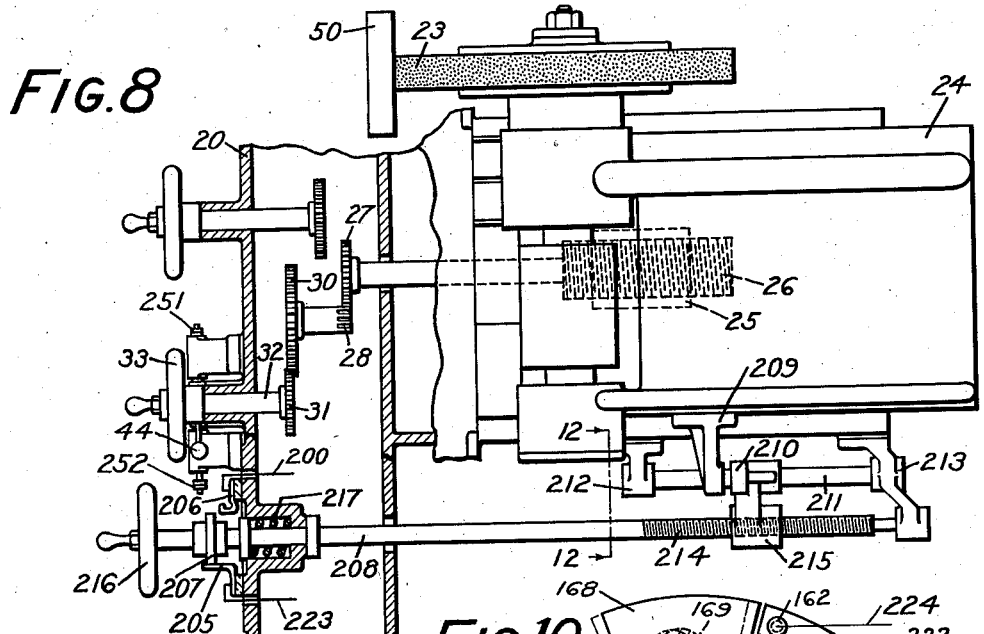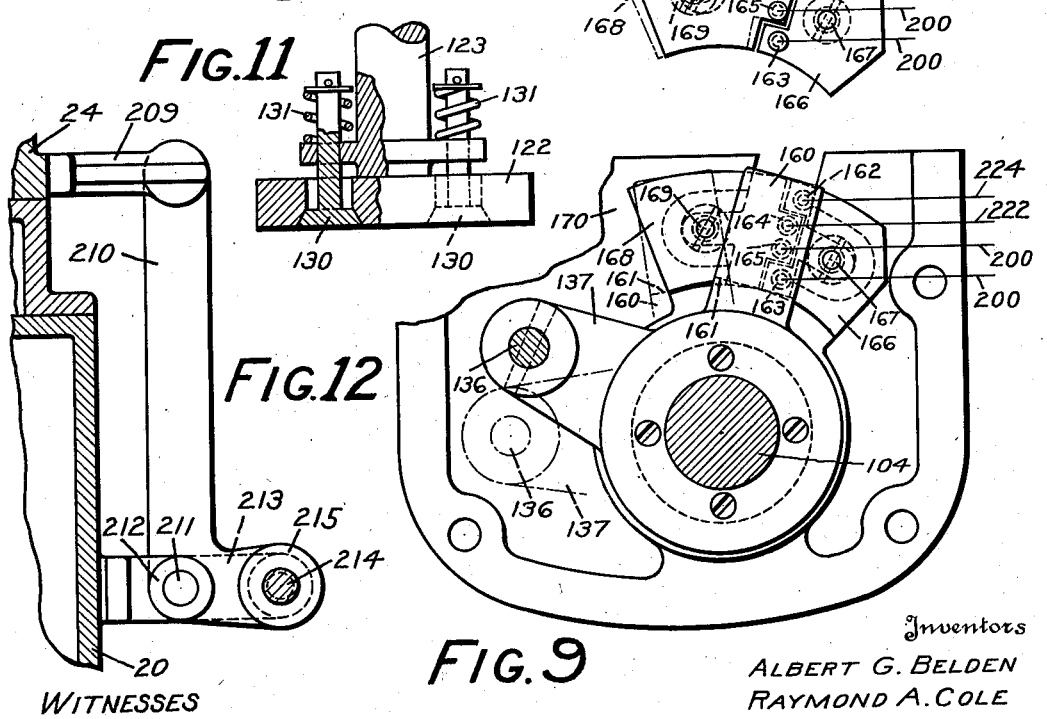

Patented June 4, 1935

2,003,334

UNITED STATES PATENT OFFICE 2,003,334

CALIPER CONTROLLED GRINDING MACHINE

Albert G. Belden and Raymond A. Cole, Worcester, Mass., assignors to Norton Company, Worcester, Mass., a corporation of Massachusetts Application July 25, 1931, Serial No. 553,066

41 Claims. (Cl. 51—165)

This invention relates to grinding machines and more particularly to a precision mechanism for accurately controlling the cycle of movement of the grinding wheel to size the work automatically.

Heretofore various size control devices have been developed for regulating and controlling the feeding movement of the grinding wheel so as to control the work size. In such machines, the work is ground while a feeler member is maintained in operative contact with the work, and the feeler member is operatively connected by an electrical apparatus to control the feeding mechanism to stop the in-feed of the grinding wheel when the work reaches a predetermined size, or to stop and reverse the feed so that the wheel is removed to an inoperative position after grinding. The feeler is maintained in contact with the work during the grinding and until the work has reached the predetermined size and then removed manually after the grinding operation has been completed. It has been found by experimental and practical tests of these previous mechanisms that the feeler member which is preferably provided with a hard point, such as a diamond point, leaves a detrimental scratch or mark on the surface of the work being ground. In these days of rapid production, accuracy heretofore unknown is required and not only accuracy but extreme refinement as to finish of the work.

To meet the demands of the large automobile plants for rapid production, it is necessary that the manual movements of the operator be reduced to a minimum so that the speed of the cycle of operation may be increased to obtain the maximum production per machine. Heretofore, in cylindrical grinding machines, it has been necessary for the operator to apply the feeler or calipering device to the work, to start the work rotation, to start the feeding movement of the wheel, and to turn on the coolant fluid, thus making four distinct manual movements required by the operator in starting the grinding on a piece of work.

It is the primary object of this invention to overcome the difficulties of the prior sizing devices and to provide a suitable size control head which controls the feeding movement of the grinding wheel and which automatically moves out of contact with the work when the work reaches a predetermined size, so that the dying out or finish grinding of the work removes any mark on the surface of the work caused by the contact of the feeler member therewith.

It is another object of this invention to provide a sizing mechanism in which movement of the size finder head into engagement with the work automatically starts the work rotation and disengagement of the head after the grinding cycle has been completed automatically stops the work rotation.

It is still another object of this invention to provide a size controlling mechanism which is so arranged that when the size finding head is brought into engagement with the work, the coolant fluid is automatically turned on and when the size finder caliper has indicated a predetermined work size, the coolant fluid is automatically shut off.

It is a further object of this invention to provide a machine of this type in which the movement of the sizing device is inter-related with that of other parts of the machine, such as the wheel feed mechanism, so that control of one part by the operator automatically controls the operation of the other parts. More specifically, the sizing device is so connected and arranged that its movement into operative contact with the work automatically starts the work rotation, turns on the coolant fluid, and starts the feeding cycle of the grinding wheel.

A further object of this invention is to provide a mechanism which causes the work to be ground at a rapid rate until the work has reached a predetermined size, after which the work is ground slowly in a finish grinding operation to perfect the shape and surface appearance of the work, and particularly to cause this finish grinding operation to take place after a predetermined time interval.

Other objects will be readily apparent from the following disclosure.

The accompanying drawings, in which like reference numerals indicate like parts, illustrate a grinding machine embodying features which satisfy all of these objects.

Fig. 2 is a cross-sectional view, on an enlarged scale, of the caliper head and timing control switch;

Fig. 3 is a fragmentary elevation, on an enlarged scale, of the calipering head shown in Fig. 2;

Fig. 4 is a fragmentary sectional view taken approximately on the line 4—4 of Fig. 2 of the calipering head;

Fig. 5 is a fragmentary rear elevation, on an enlarged scale, showing the mounting for the size calipering head;

Fig. 6 is a fragmentary plan view of the calipering head taken approximately on the line 6—6 of Fig. 2 with the top cover removed;

Fig. 7 is a fragmentary detail view, on an enlarged scale, taken approximately on the line 7—7 of Fig. 5, showing the electric contact member;

Fig. 8 is a fragmentary plan view of a grinding machine partly shown in section to indicate the wheel feeding mechanism and a portion of the electrical control apparatus;

Fig. 9 is a fragmentary sectional view, on an enlarged scale, taken approximately on the line 9—9 of Fig. 5, showing the contact members;

Fig. 10 is a fragmentary detail view showing the adjustability of the contact members as shown in Fig. 9;

Fig. 11 is a fragmentary view partly in section of the dash-pot piston as shown in Fig. 2;

Fig. 12 is a fragmentary view, on an enlarged scale, taken approximately on the line 12—12 of Fig. 8 showing details of the rearward limit switch for controlling the rearward movement of the grinding wheel slide;

Fig. 13 is a fragmentary sectional view through the movable bell-crank lever in the caliper head, on an enlarged scale, showing the knife-edge support for the bell-crank lever;

Fig. 14 is a fragmentary view, on an enlarged scale, of the arcuate slide for controlling the movement of the calipering head;

Fig. 15 is a cross-sectional view, on an enlarged scale taken approximately on the line 15—15 of Fig. 14; and Fig. 16 is a fragmentary detail view taken approximately on the line 16—16 of Fig. 1 showing the clutch operating mechanism on the headstock.

Figure 1:
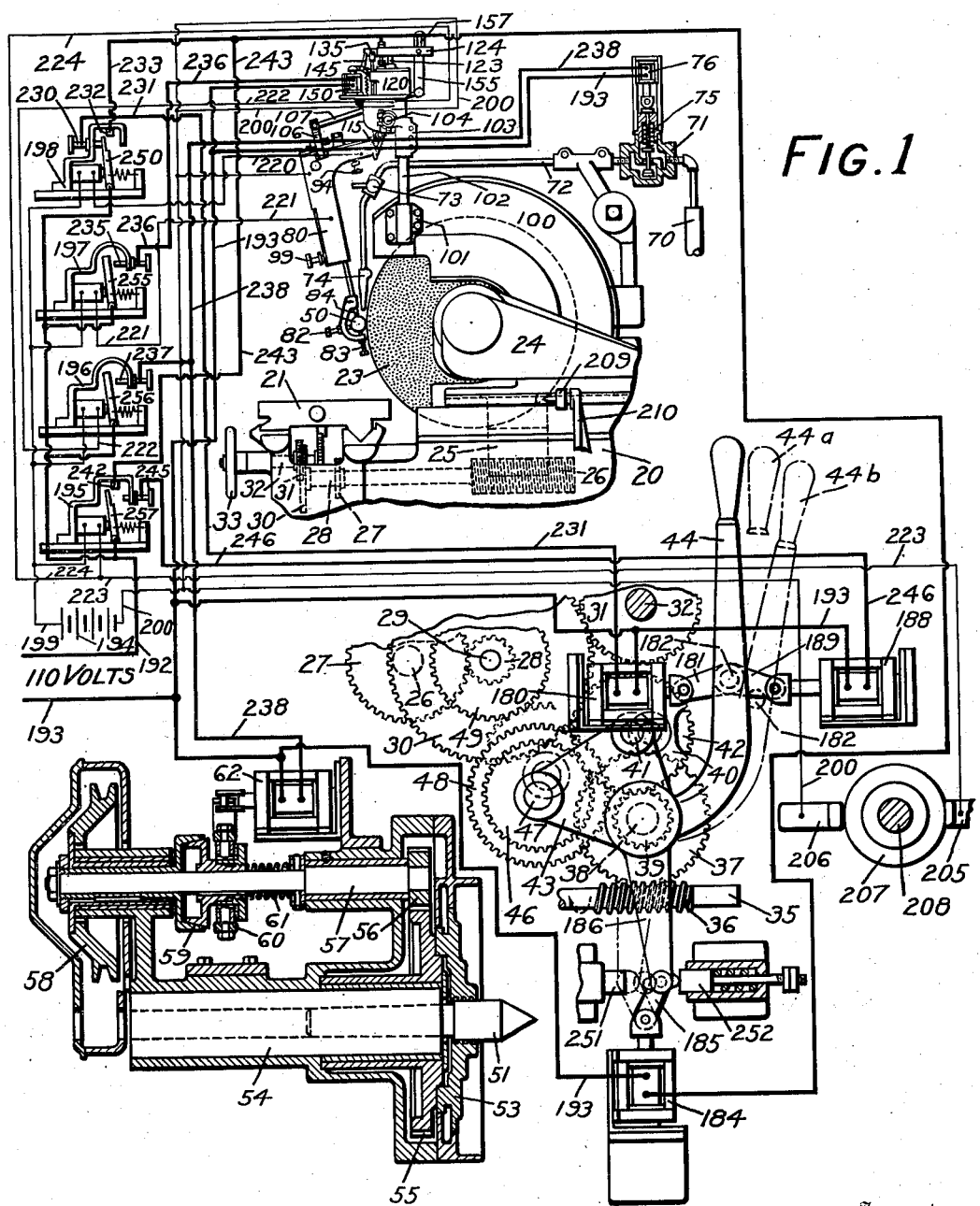
Fig. 1 is a combined structural and diagrammatic showing of the improved size controlling mechanism.

In accordance with this invention, a grinding machine is provided in which a gaging device serves to stop the grinding operation when the work has reached a predetermined size. More specifically, the machine is so constructed that the grinding wheel may grind the work during a fast or roughing operation and then, when the work has reached a predetermined size, the rate of wheel feed is changed to cause the work to be ground slowly, and thus produce a finished surface and to correct imperfections in size and shape. For this purpose, a time delay mechanism may be employed which operates, after the gaging feeler has indicated a definite work size, to cause the grinding wheel to grind the work for a finish cut for a predetermined time interval, whereupon a reversing mechanism serves automatically to separate the grinding wheel and the work, and thereby stop the grinding operation. As a further feature, the mechanism is preferably so arranged that the calipering feeler is removed from contact with the work prior to the end of the grinding operation, thereby eradicating any marking on the work caused by the feeler.

The grinding machine illustrated in the drawings comprises a standard type of cylindrical grinding machine provided with a work sizing device electrically connected to control various mechanisms which govern the grinding operation. As one feature, the caliper head is so arranged that prior to the dying-out grinding operation, the caliper is automatically removed from contact with the wheel. Also, it is so interconnected with the wheel feeding mechanism that movement of the wheel and the caliper towards the work are in a timed relation, and the arrangement is preferably such that movement of one part towards the work automatically starts the other in the same direction. The sizing or calipering head is preferably interconnected through an electrical apparatus with a fluid control device so that movement of the size finding head into operative engagement with the work automatically turns on the coolant fluid, automatically starts the work rotation and automatically starts the infeeding movement of the grinding wheel. In such a machine, the infeeding movement of the grinding wheel continues at a grinding speed, until the work is ground to approximately the required size, when the caliper feeler has reached a predetermined position and operates through the electric circuit to stop the infeeding movement. Grinding continues without any infeed until the caliper causes a timing device to operate and cause movement of the calipering head from the work. The grinding wheel remains in contact with the work to finish grind the same while the caliper head remains out of contact therewith. The automatic movement of the head away from the work is controlled by a timing device which may be of any suitable type, either electrical, mechanical, fluid pressure, or by a combined electrical and fluid pressure device, as shown in the accompanying drawings. As the size finder or caliper head swings automatically away from the work, it breaks a second circuit so as to close the coolant fluid valve and stop the flow of coolant fluid, and also to actuate a clutch and reverse the feeding movement of the grinding wheel. The speed of movement of the head in the form illustrated is controlled by the timing device so as to control the breaking of a set of contact members at a predetermined time and cause the wheel feeding movement to be reversed and thereby separate the grinding wheel and work when the work has been ground to a predetermined size. This mechanism is so arranged that the rearward movement continues until the grinding wheel slide reaches a predetermined position whereupon contacts are made to stop the rearward feed, so that the ground piece of work may be readily removed and a new piece inserted for grinding.

A grinding machine has been illustrated in the drawings which comprises a base 20 having a longitudinally movable work supporting table 21 supported thereon. The base 20 also supports a rotatable grinding wheel 23 which is in turn supported on a wheel slide 24 for transverse movement on the base to produce the desired grinding action.

*Feeding mechanism*

The wheel slide 24 may be fed towards or from the work by a feeding mechanism, including a half nut 25 depending from the slide 24 and a feed screw 26 which is rotatably mounted in the base of the machine. The feed screw may be turned either manually or by a power actuated clutch operated mechanism to feed the grinding wheel in either direction. For the sake of simplicity of illustration, a feeding mechanism such as shown in the prior U. S. patent to Belden and Whittle 1,733,049 dated October 22, 1929 has been illustrated. Inasmuch as the specific means for controlling the movement of the grinding wheel is not part of the present invention, it has been illustrated only in a simplified form and for a more complete disclosure of the feed mechanism, reference may be had to the above-mentioned prior patent. The forward end of the feed screw 26 carries a gear 27 meshing with a pinion 28 on the shaft 29 which is rotatably supported in the base 20. The shaft 29 also carries a gear 30 meshing with a gear 31 on a shaft 32. A hand wheel 33 is mounted on the outer end of the shaft 32 and is so connected and arranged that manual rotation of the wheel operates through the gear 31, 30, pinion 28 and gear 27 to rotate the feed screw 26 so as to feed the grinding wheel slide either towards or from the work.

The feed screw 26 may be rotated manually by a hand wheel 33 or by a power mechanism which includes a forward and reverse tumbler gear mechanism such as shown in the prior patent, above referred to. A drive shaft 35 is mounted in the base of the machine and may be driven from any suitable source of power. The shaft 35 carries a worm 36 meshing with a worm gear 37 on the shaft 38. The shaft 38 carries a small gear 39 which meshes with a gear 40 on the stud 41. A second gear 42 is also mounted on the stud 41 and arranged to serve as a tumbler gear to be thrown into and out of mesh with the gear 30 to rotate the feed screw and cause a forward or infeeding movement of the grinding wheel. The stud 41 is supported in a frame 43 which pivots on the shaft 38. The frame 43 may be rocked manually by a lever 44 so that the tumbler gear 42 may be thrown into or out of mesh with the gear 30.

In order to obtain a reverse feeding movement to cause a rearward movement of the grinding wheel, a gear 46 meshes with the gear 40 and is rotatably mounted on a stud 47 on the tumbler gear frame 43. The stud 47 carries a tumbler gear 48 which is arranged to be thrown into mesh with a gear 49 fixed on the shaft 29 so as to rotate the feed screw 26 in the reverse direction and cause a rearward movement of the grinding wheel. It will be readily appreciated from the foregoing that when the lever 44 is in the full line position, as indicated in Fig. 1, the tumbler gear 42 meshes with the gear 30 and causes a forward or infeeding movement of the grinding wheel. When the lever is moved to the position 44a, as shown in broken line in Fig. 1, the tumbler gears 42 and 48 are out of mesh and the wheel slide remains stationary. When the lever 44 is shifted into position 44b, as shown in broken lines in Fig. 1, the tumbler gear 48 meshes with the gear 49 so as to cause a reverse rotation of the feed screw and a rearward movement of the grinding wheel slide.

Headstock mechanism

The work piece 50 may be rotatably supported on a suitable mechanism such as a headstock center 51 and a footstock center (not shown) which may be of any of the well-known constructions. A suitable headstock mechanism is provided for rotating the work and preferably comprises a motor driven headstock, such as shown in the prior patent to Belden 1,631,458 dated June 7, 1927. The headstock may be either of the rotatable spindle type or of the non-rotatable fixed center type. As illustrated in the drawings, the center 51 is non-rotatable. Since the headstock itself does not form any part of the present invention, it has been only illustrated diagrammatically in Fig. 1 to illustrate the connections for stopping and starting the work rotation. The work is driven by a driving plate 53 rotatably supported on the spindle 54. The plate 53 is fixed to a gear 55 meshing with a small gear 56 on a second shaft or spindle 57. The spindle 57 may be driven by any suitable means, such as a motor on the headstock or from an overhead source of power, which is connected to a pulley 58 freely rotatable on the end of the shaft 57 and arranged to be connected to rotate the shaft 57 by means of a clutch 59. The movable clutch member is actuated by a yoked member 60 so that it may be engaged or disengaged when desired. A spring 61 serves to hold the clutch member in engagement to rotate the headstock drive and the work piece. The yoked member 60 is operatively connected to a solenoid 62 which is arranged so that when the solenoid is energized, it operates to disengage the clutch 59 against the compression of the spring 61 to stop the work rotation.

Coolant fluid system

In most cylindrical grinding operations, a coolant fluid is desirable. As illustrated in the drawings coolant fluid may be pumped from a reservoir (not shown) in the base through a pipe 70, a valve 71, a pipe 72, a manually operable valve 73, and a spout 74 to convey coolant fluid to the grinding wheel and the work. The valve 71 is biased to an open position by means of a spring 75 and may be closed by the energizing of a solenoid 76.

Size finder or caliper head

In order that the work may be automatically sized, a suitable calipering or sizing device is employed to control the feeding movement of the grinding wheel. In the preferred form, a calipering head is provided similar to that disclosed in our U. S. Patents Nos. 1,911,552, and 1,911,553 dated May 30, 1933. A work engaging head 80 is provided having adjustable work engaging screws 82 and 83 which engage the work opposite to and below the line of contact between the grinding wheel and the work. A slidable feeler 84 opposes the screw 83 so as to engage the work at substantially diametrically opposite points so as to control the work by gauging it upon a diameter or a chord depending upon the adjustment of the screw 82. The feeler 84 is slidably mounted within the head 80 and is engaged at its upper end by a micrometer screw 85 threaded into a bell crank lever 86 which is pivoted on a knife edge 87 resting in a V-shaped support 88 which is supported on the caliper head 80. A spring pressed plunger 89 serves to hold the knife edge 87 in engagement with the supporting V-shaped groove 88. A short arm 90 of the bell crank lever is provided with a contact 91 positioned to engage contact member 92 which is fixed within the head 80 and insulated therefrom by the block 93. A suitable adjusting screw 94 is provided to adjust the position of the contact member 92 relative to the head 80. A long arm 95 of the bell crank lever 86 is provided with a contact member 96 arranged to engage a contact member 97 which is fixed to the head 80 and insulated therefrom by a block 98. A suitable adjusting screw 99 is provided to adjust the contact member 97 so as to vary the point of making and breaking of the contact members.

The head 80 is preferably supported on a fixed part of the machine and as illustrated is supported on the wheel guard 100 by means of a bracket 101 having a vertically extending post 102. A bracket 103 is supported on the upper end of the post 102 and in turn supports a cross-shaft 104 which serves as a support for the calipering head. The upper end of the head 80 is provided with a supporting bracket 106 which is pivotally connected to one end of a rod 107. The rod 107 is mounted in a bracket 108 pivotally mounted on the shaft 104. A clock spring 109 having one end fixed to the shaft 104 and the other end fixed to a stud 110 on the bracket 108 exerts a pressure tending to hold the size finder or caliper head in an upper or inoperative position, as indicated in broken lines in Fig. 3. When the head 80 is swung downwardly into operative engagement with the work, a groove 114 in the head 80 engages a pin 115 on a slide block 116 which is arranged to slide within an arcuate slide-way 117.

When the head 80 is in an operative position with the contact screws 82 and 83 and feeler 84 in an engagement with the work, the spring 109 serves to exert an upward pressure upon the contact screw 83 so that the gauge or head is held in contact with the surface of the work as it is reduced in size.

Timing control

To attain various objects of this invention, a suitable timing or time delay device is provided which serves, after a rough grinding operation has been completed, to cause the grinding wheel to grind the work for a finishing operation for a predetermined time interval. This timing mechanism is controlled by a member which moves in response to a reduction in size of the work so that when a definite work size has been indicated, the time delay mechanism will be brought into operation. This may be so arranged that the grinding wheel may be fed rapidly into the work for a roughing grinding operation until a feeler contacting with the work indicates a predetermined size, whereupon the delay mechanism starts into operation and, after a definite time interval, the feeding mechanism may be reversed to separate the wheel and work and stop the grinding operation. In the preferred construction, the parts are so arranged that the feeler operates through an electrical mechanism and serves to cause the forward feed of the wheel into the work to be stopped and permit a dying-out and finish grinding operation to be effected. When the feeler mechanism indicates a second predetermined, smaller work size, then the time delay mechanism is set into operation to permit the dying-out cut to carry on through a predetermined time interval, after which the reversing mechanism separates the wheel and work. Also, in the preferred construction, the feeler is automatically removed from contact with the work prior to the end of the grinding operation permitted by the time delay mechanism. In the preferred construction, an electrically controlled dash-pot mechanism comprising a dash-pot cylinder 120 is supported on a housing 121 which is in turn supported on the shaft 104. A dash-pot piston 122 is slidably mounted within the cylinder 120 and fixedly connected by a piston rod 123 with a cross arm 124. The piston is urged in a downward direction by means of a compression spring 125 within an upper chamber 126. Oil within a lower chamber 127 is forced through a passage 128, through a needle valve 129 and into the chamber 126. By regulating the aperture of the valve 129, the speed of the downward movement of the dash-pot piston 122 may be regulated. The return or upward movement of the piston 122 is facilitated by a pair of check valves 130 which are normally held in a closed position by springs 131, the tension of the springs 131 being only sufficient to maintain the valves normally in a closed position. As the piston is moved upwardly, the oil is forced downwardly through the valve 130 and may also pass back through the needle valve 129 and passage 128 into the lower chamber 127. The cross arm 124 is connected by a link 135 to a stud 136 on a rock arm 137 which is rotatably mounted on the shaft 104. The rock arm 137 is connected by a link 138 to a stud 139 on the arcuate slide 116.

A latch or pawl 145 is provided to engage a notch 146 in the cross arm 124 to maintain the dash pot latched in its uppermost position. The pawl 145 is pivotally mounted on a stud 147 which is in turn supported on a bracket 148 extending from the cylinder 120 and is held in a latched position by means of a spring 149. An electric solenoid 150 is operatively connected to trip the pawl 145, when it is energized.

A link 155 is connected to an end 156 of a rod 107 and is provided with an elongated slot 157 at its upper end, engaging a stud 159 on the cross arm 124. When the head 80 is swung downwardly into engagement with the work, the rod 107 is rocked from the position as shown in broken lines in Fig. 3, at first transmitting no motion to the cross arm 124 until the end of the elongated slot engages the stud 159. Further upward movement of the link 155 moves the cross arm 124 upwardly into a position as shown in full line in Figs. 2 and 3 until the cross arm engages the adjustable stop nut 158. At this point, the pawl 145 engages the notch 146 and locks the dash pot in a latched or uppermost position.

Automatic control, work rotation and coolant fluid

To attain one of the objects of this invention, a suitable electric control is provided so that when the size finder head is thrown into operative engagement with the work, the cooling fluid will be turned on and the work rotation as well as the infeeding movement of the wheel started.

The rock arm 137 is provided with an upwardly extending arm 160 carrying a contact member 161 which is arranged to engage contact members 162, 163, 164 and 165. These contact members are connected as hereinafter described to control the stopping and starting of the work rotation, the turning on and shutting off of the coolant fluid supply and the starting of the infeed of the grinding wheel. To permit relative adjustment of the contact members so as to vary the time of operation of the various mechanisms, the contact members 162 and 163 are mounted on an adjustable insulating block 166 which is held in adjusted position by a screw 167. The contact members 164 and 165 are in turn supported on an adjustable insulating block 168 which is held in place by a screw 169 on the bracket 170 (Figs. 9 and 10). It will be readily appreciated from the foregoing that when the size finder head is moved downwardly into operative contact with the work, the rod 107 moves the link 155 upwardly. During the first part of this movement, the link 155 rides idly over the stud 159. When the end of the elongated slot contacts with the stud 159, continued movement raises the cross arm 124 and the dash-pot piston 122 into a latched position. As the arm 124 moves upwardly, it carries with it the link 135 and rocks the arm 137 from the dotted position as indicated in Fig. 2, into the full line position in Fig. 2. During this movement, the contact member 161 carried by the arm 160 moves in a clockwise direction, as viewed in Figs. 2 and 9, so that the contact member 161 first engages the contact members 164 and 165 and then engages the contact members 162 and 163.

Electrical control apparatus

The make or break contact members in the size finder head, and the contact points opened and closed by the movement of the head may be connected directly to the electrical controlling mechanism for operating the various mechanisms of the machine. In order to avoid arcing at the contact points during the making or breaking periods so as to increase the accuracy of the operation of the mechanism, it is preferable to utilize a low energy current on the make or break points and to so connect the make or break points and contact members with relay circuits which in turn operate to make or break higher energy currents to energize and deenergize solenoids which control the various mechanisms.

In order that the feeding mechanism may be automatically started when the size finder or caliper head is swung into engagement with the work, a solenoid 180 is mounted on the front of the base of the machine and is connected by a link 181 to a stud 182 on the feed control lever 44. When the solenoid 180 is energized, the lever 44 will be pulled into the full line position, as indicated in Fig. 1, swinging the tumbler gear 42 into mesh with the gear 30 to cause an infeeding movement of the grinding wheel. A solenoid 184 is connected by a link 185 with a depending arm 186 of the control lever 44. When the solenoid 184 is energized, it serves to pull on the link 185 and to rock the lever 44 into a neutral position 44a. A solenoid 188 also mounted on the base is connected by a link 189 with the stud 182 on the lever 44, and serves when energized to swing the feed control lever 44 to position 44b so as to swing the tumbler gear 48 into mesh with gear 49 and thereby to cause a rearward feeding movement of the grinding wheel.

To limit the rearward movement of the grinding wheel slide, a suitable switch is provided to operate through an electric circuit to terminate the rearward feeding movement of the wheel. As illustrated in the drawings, this may comprise a contact member 205 and a contact member 206 which are fixed to and insulated from the base of the machine. These two contact members are arranged in the path of movement of a disc 207 which is mounted on a shaft 208 and insulated therefrom. The disc 207 serves to make the circuit connecting the contact 205 with the contact 206 when the disc is moved rearwardly. The shaft 208 is connected with the wheel slide so that when the slide moves rearwardly, the disc 207 is drawn also towards the rear as shown in Fig. 8 to make contact with the contact members 205 and 206 and close the circuit. This mechanism may comprise a bracket 209 fixed to the wheel slide. An adjustable stop member 210 is slidably mounted on the shaft 211 which is in turn supported in bearings 212 and 213 on the base of the machine. The inner end of the shaft 208 is provided with a screw thread 214 engaging a threaded portion 215 of the stop 210. It will be readily appreciated that by turning the shaft 208 by means of the hand wheel 216, the position of the stop 210 may be varied relative to the stop 209 on the wheel slide. As the wheel slide moves rearwardly, the stop 209 engages the adjustable stop 210 and moves it rearwardly carrying the shaft 208 which in turn moves the disc 207 against the tension of a spring 217 to make contact between the contact members 205 and 206, which are connected as hereinafter described to stop the rearward feeding movement of the grinding wheel. When the grinding wheel slide is moved forward, the stop member 209 moves away from the stop 210 and the released tension of the spring 217 returns the contact disc 207 into the position as shown in Fig. 8 breaking the circuit between the contact members 205 and 206.

Interposed between the contact members in the size finder or caliper head and the various solenoids for controlling the mechanisms of the machine, is a series of relays which operate on a low energy current (such as a battery) by which circuits are made or broken. The relays are in turn connected to 110-volt or higher energy circuits to energize or deenergize a plurality of solenoids for controlling the various mechanisms of the machine.

A high energy current, such as 110 volts, may be supplied from any suitable source of power for energizing the solenoid to control the feeding mechanism. As illustrated in the drawings, the power wires 192 and 193 are illustrated as supplying high energy current to the circuit. Wire 192 is connected to the movable member of each relay 195, 196, 197 and 198 respectively. Wire 193 is connected to one terminal of each solenoid 62, 76, 150, 180, 184 and 188 respectively.

A low energy or battery current may be supplied from any suitable source of power but for simplicity of illustration, a diagrammatic showing of the battery 194 has been illustrated. A wire 199 leading from one terminal of the battery is connected to one terminal of the electro-magnet on each of the relays 195, 196, 197 and 198. The wire 200 which leads from one battery terminal is connected to the bell crank lever 95 within the size finder head, and to the contacts 163 and 165 on the upper part of the head below the dash-pot and also to a contact member 206 on the rearward limit switch.

The contact member 92 in the size finder head is connected by a wire 220 with the other end of the electro-magnet on the relay 198. The contact member 97 within the size finder head is connected by a wire 221 with the other terminal of the electro-magnet in relay 197. The contact member 164 is connected by a wire 222 with the other terminal of the electro-magnet on the relay 196. The contact member 205 on the rearward limit switch is also connected by a wire 223 with the same terminal of the electro-magnet on relay 195. Contact member 162 is connected by a wire 224 with the other terminal of the electro-magnet on relay 195.

The adjustable terminal 230 of the relay 198 is connected by a wire 231 with the solenoid 180. The fixed contact 232 of relay 198 is connected by a wire 233 with the solenoid 184. The adjustable contact 235 on relay 197 is connected by a wire 236 with the solenoid 150. The adjustable contact member 237 of relay 196 is connected by a wire 238 with the solenoid 62 which actuates the headstock clutch to control the work rotation. The wire 238 is also connected to one terminal of the solenoid 76 which is arranged to operate the fluid control valve 71. The fixed contact member 242 on relay 195 is connected by a wire 243 with the wire 233 which is in turn connected with one terminal of the electro-magnet 184. The adjustable contact member 245 of the relay 195 is connected by a wire 246 with one terminal of the solenoid 188.

Operation

The operation of this grinding machine is as follows. A piece of work 50 is mounted in the machine between the head and footstock centers. The operator then manually swings the caliper head 80 downwardly into operative engagement with the work so that the feeler 84 and screws 82 and 83 engage the work as illustrated in Figs. 1 and 2. During this movement of the head 80, the arm 160 moves in a clockwise direction as viewed in Fig. 9 so that contact member 161 engages the contact members 164 and 165 closing the circuit through wires 200 and 222 to deenergize the electro-magnet in relay 196 and thereby energize solenoids 62 and 76 to start the work rotation and to start the flow of coolant fluid.

As the movement of the contact member 161 continues in a clockwise direction, it engages the contact members 162 and 163 to make the circuit through wires 200 and 224 to energize the electro-magnet in relay 195. The energizing of relay 195 breaks the circuit between the movable member and the adjustable contact 245, which breaks the circuit between wires 246 and 192, deenergizing the solenoid 188.

The initial swinging of the caliper head 80 into operative position in engagement with the work moves the feeler 84 upwardly so as to rock the bell crank 95 and thereby close the circuit between the wires 200 and wire 220 and also makes contact between the wire 200 and the wire 221. When the bell crank swings so as to engage the contact member 92, a circuit is made through wires 200 and 220 to energize the electro-magnet on relay 198, which makes a circuit between wire 231 and wire 192 so as to energize the solenoid 180 to rock the tumbler gear 42 into mesh with gear 30 and start an infeeding movement of the grinding wheel.

When the bell crank 95 moves so that its lower end engages the contact member 97, it makes a circuit through the wires 200 and 221 to energize the electro-magnet in relay 197, thereby breaking the circuit between wire 192 and wire 236 so as to deenergize solenoid 150 allowing the spring 149 to move to exert a pressure tending to move the pawl 145 in a clockwise direction as viewed in Fig. 2. During the movement of the head 80 into an operative position, the rod 107 rocks from a broken line position as indicated in Fig. 3 into the full line position as shown in Figs. 1, 2 and 3. During the first part of this movement, the link 155 lies idly over the pin or stud 159. When the end of the elongated slot 157 engages the stud 159, it moves the cross arm 124 upwardly returning the dash-pot piston into the uppermost position as indicated in Fig. 2. When this position is reached, the tension of the spring snaps the pawl 145 into engagement with the surface 146 so as to lock the dash-pot timing mechanism in its starting position.

The infeed of the grinding wheel continues to rough grind the work until the feeler 84 moves downwardly, due to reduction in size of the work being ground, allowing the bell crank lever 95 to rock in a clockwise direction breaking the contact between the bell crank and contact 92. This breaking of contacts breaks the circuit between wires 200 and 220, deenergizing the electro-magnet in relay 198 so that the spring returns the movable member 250, breaking the circuit between the wire 192, contact 230, and wire 231 so as to deenergize the solenoid 180. As the movable member 250 of relay 198 swings in a clockwise direction, its upper end makes instantaneous contact with the contact member 232, thereby making a circuit between the wire 192 and wire 233 to energize the solenoid 184 so as to give a downward pull on the link 185 and to swing the tumbler gear 42 out of mesh with the gear 30, thereby stopping the infeeding movement of the grinding wheel. A pair of spring-pressed plungers 251 and 252 serve to centralize the lever 186 and hold the tumbler gear in a neutral or inoperative position.

The grinding wheel remains in contact with the work so as to permit the wheel to grind out or finish grind the work piece while there is no forward feeding movement thereon. This condition exists until the feeler member 84 has moved downwardly so that the work has substantially reached the predetermined size. When the bell crank 95 moves a sufficient distance in a clockwise direction to break contact with the contact member 97, thereby breaking the circuit between wires 200 and 221 so as to deenergize the magnet in relay 197 allowing the spring to move, the movable member 255 moves into contact with the adjustable contact 235 so as to make the circuit between the wire 192 and wire 236 to energize the solenoid 150. Energizing the solenoid 150 moves the pawl 145 in a counterclockwise direction and the released tension of the spring 125 starts the downward movement of the dash-pot piston 122. The needle valve 129 has previously been adjusted so as to properly time the downward movement of the piston. During the downward movement of the dash-pot piston 122, the cross head 124 pushes downwardly upon the link 135 rocking the arm 137 and link 138 in a downward direction to swing the size finder head 80 about the end of the rod 107 as a pivot so that the feeler 84 and screws 82 and 83 are swung away from engagement with the work, still leaving the grinding wheel in operative contact with the work so that any line or mark caused by the feeler and contact screws 84, 82 and 83 respectively will be removed. Shortly after the caliper head 80 has swung clear of the work, the continued downward movement of the dash-pot operates through the link 155 to swing the rod 107 releasing the tension of the spring 109 and permitting the size finder head to move upwardly into the dotted line position as indicated in Fig. 3. During this upward swinging movement of the gauge, the counterclockwise movement of the arm 137 swings the arm 160 in a counterclockwise direction, first breaking the contacts 162 and 163 to break the circuit between wires 200 and 224 so as to deenergize the relay 195 allowing the movable contact 257 to swing in a clockwise direction to make instantaneous contact with member 242 making circuit between wires 192 and 243 to energize solenoid 184 to swing the tumbler gears into a neutral position. Continued swinging movement of member 257 makes contact with the adjustable member 245, making contact between the wire 192 and wire 246 so as to energize the solenoid 188, thereby throwing the tumbler gear 48 into mesh with gear 49 to cause a rearward movement of the grinding wheel.

Continued counterclockwise movement of the arm 160 breaks the circuit between the contact members 161, 164 and 165 to break the circuit between the wires 200 and 222, deenergizing the magnet in relay 196 and allows its movable member 256 to swing into engagement with the adjustable member 237 so as to make circuit between the wire 192 and the wire 238 to energize the solenoids 62 and 76, thereby disengaging the clutch to stop the work rotation and to close the valve and stop the flow of coolant fluid.

The rearward feeding movement of the wheel slide continues until the stop 209 engages the adjustable stop 210, moving the shaft 208 rearwardly until the disc 207 engages the contact member 206, making the circuit between the wires 200 and 223 to energize the magnet in relay 195 to swing the movable member 257 away from the adjustable member 245, breaking the circuit between the wire 192 and the wire 246 so as to de-energize the solenoid 188, releasing its pull upon the control lever. As the movable member 257 swings in a clockwise direction under the pull of the magnet in relay 195, it makes instantaneous contact with the fixed contact member 242 so as to make contact between the wire 192 and the wire 243, thereby energizing the solenoid 184 which exerts a downward pull on the link 185 to rock the tumbler gear 48 out of mesh with the gear 49 to stop the rearward movement of the grinding wheel. The work may then be removed from the machine and replaced by a new piece of work and the cycle then repeated.

By regulating the needle valve 129 in the dashpot control mechanism, the time of the caliper head removing from the work and the breaking of the contact point to cause the rearward feed may be regulated to accurately control the finished size of the work feed.

The term "calipering device" or "gaging device" as used in the specification and claims is to be interpreted as covering any device in which a part moves in response to a reduction of the work to a predetermined size so as to control the grinding wheel feed through the action of associated mechanism governed thereby.

Having thus described the invention, what is claimed as new and desired to secure by Letters Patent is:

1. A grinding machine comprising a rotatable grinding wheel and a work support which are movable relatively toward and from each other, a feeding mechanism to cause said relative movement, mechanism including a work engaging feeler arranged to continuously engage the work during grinding which controls said feeding mechanism, and means responsive to and actuated by movement of said feeler as the work is reduced in size to move the feeler automatically out of engagement with the work when the work has been ground to a predetermined size and before the grinding wheel is removed from engagement with the work.

2. A grinding machine comprising a rotatable grinding wheel and a work support which are movable relatively toward and from each other, a feeding mechanism to cause said relative movement, a device including a work engaging caliper to control said feeding mechanism, means to move said caliper out of engagement with the work when the work has been ground to a predetermined size, and means cooperating with said device to cause the work to be ground to a further predetermined extent sufficiently to remove the markings on the work caused by said caliper and thereafter stop the grinding operation.

3. A grinding machine comprising a rotatable grinding wheel and a work support which are movable relatively towards and from each other, an electrically controlled wheel feeding mechanism to cause such movement, a calipering device having a movable feeler arranged to engage the work during the grinding operation, electric control mechanism which controls the feeding movement of the wheel, and means cooperating therewith which serves to remove the calipering device automatically from contact with the work at a predetermined time interval before the work has reached a predetermined size.

4. A grinding machine comprising a rotatable grinding wheel and a work support which are movable relatively towards and from each other, an electrically controlled reversible wheel feeding mechanism to cause such movement, a calipering device having a movable feeler arranged to engage the work during the grinding operation, electric control mechanism responsive to movement of the feeler which automatically reverses said feeding mechanism, and means cooperating therewith which serves to remove the calipering device automatically from contact with the work at a predetermined time interval before the work has reached a predetermined size and then to reverse the feeding mechanism and stop the grinding operation when the work has attained said size.

5. A grinding machine comprising a rotatable grinding wheel and a work support which are movable relatively towards and from each other, means including a clutch to rotate the work, a power actuated feeding mechanism to cause said relative movement, means including a work engaging caliper to control the feeding mechanism, means to automatically move said caliper out of engagement with the work into an inoperative position after the work has been ground to a predetermined size, means cooperating with said work caliper to cause the work to be ground to a further predetermined extent thereafter, and means actuated by and responsive to movement of the caliper to an inoperative position to disconnect said clutch and stop the rotation of the work.

6. A grinding machine comprising a rotatable grinding wheel and a work support which are movable relatively towards and from each other, a coolant fluid system including a valve to convey coolant fluid to the grinding wheel and work, a power actuated feeding mechanism to cause said relative movement, means including a work engaging caliper having a feeler mechanism arranged to continuously engage the work which serves to control the feeding mechanism, means actuated by said movable feeler to automatically move said caliper out of engagement with the work and to an inoperative position after the work has been ground to a predetermined size, and electrically actuated means responsive to movement of said caliper to an inoperative position to close said valve and stop the flow of coolant fluid.

7. A grinding machine comprising a rotatable grinding wheel and a work support which are movable relatively towards and from each other, means including a clutch to rotate the work, means including a valve to supply coolant fluid to the wheel and work, a power actuated feeding mechanism to cause said relative movement, means including a work engaging caliper having a movable feeler arranged to continuously engage the work which serves to control the feeding mechanism, means responsive to said movable feeler to automatically move said caliper out of engagement with the work when the work has been ground to a predetermined size, and electrically actuated means responsive to movement of said caliper to an inoperative position to disconnect the clutch and stop the work rotation and to close said valve and stop the flow of coolant fluid.

8. A grinding machine comprising a work support, a rotatable grinding wheel, a support therefor mounted for movement towards and from the work, a calipering device engageable with the work and mounted for movement from an inoperative to an operative position relative to the work and means interconnecting the caliper and the wheel support whereby movement of one towards the work causes movement of the other towards the work.

9. A grinding machine comprising a rotatable grinding wheel and a work support which are movable relatively towards and from each other, a power actuated feeding mechanism to cause said relative movement, means including a work engaging caliper to control the feeding mechanism and means actuated by movement of said caliper into engagement with the work to start the in-feeding movement of the grinding wheel.

10. A grinding machine comprising a rotatable grinding wheel and a rotatable work support which are movable relatively towards and from each other, means including a clutch to rotate the work, means including a valve to supply a coolant fluid to the grinding wheel and work, a power actuated feeding mechanism to cause the relative movement, means including a work engaging caliper to control the feeding mechanism and means actuated by movement of said caliper into engagement with the work to automatically start the in-feeding movement of the grinding wheel, to engage said clutch and start the work rotation, and also to open said valve and start the flow of coolant fluid.

11. A grinding machine comprising a base, a rotatable grinding wheel and a work support which are movable relatively towards and from each other, an electrically controlled feeding mechanism to cause said relative movement, means including a work engaging caliper to control the feeding mechanism, a timing device including a member arranged to be latched by movement of the caliper into an operative position, means responsive to movement of the caliper to cause operation of the timing device, and means responsive to the timing device which causes the caliper to be removed from contact with the work when the work has been ground to a predetermined size.

12. A grinding machine comprising a base, a rotatable grinding wheel and a work support which are movable relatively towards and from each other, an electrically controlled feeding mechanism to cause said relative feeding movement, means including a work engaging caliper to control the feeding mechanism, a timing device including a member arranged to be latched by movement of the caliper into operative position, means responsive to movement of the caliper to cause operation of the timing device, means responsive to the timing device which causes the caliper to be removed from contact with the work when the work has been ground to a predetermined size, and means for adjusting the timing device to control the time interval between the initial starting of the timing device and the removal of the caliper from the work.

13. A grinding machine comprising a base, a rotatable grinding wheel and a work support thereon which are movable relatively towards and from each other, an electrically controlled feeding mechanism to cause said relative movement, means including a work engaging caliper to control the feeding mechanism, a movable support for said caliper arranged to move said caliper into an operative position in engagement with the work, a timing device arranged to be latched by the movement of the caliper into an operative position, means responsive to the movement of the caliper to trip said timing device, and means responsive to the timing device which causes the caliper to be removed from contact with the work when the work has been ground to a predetermined size.

14. A grinding machine comprising a rotatable grinding wheel and a work support which are movable relatively towards and from each other, an electrically controlled feeding mechanism to cause said relative movement, means including a work engaging caliper to control the feeding mechanism, means including a solenoid actuated clutch to rotate the work, means including a solenoid actuated valve to control the flow of coolant fluid, a timing device arranged to automatically remove the caliper head from engagement with the work and means including a switch actuated by movement of said timing device to automatically shut off the flow of coolant fluid and to automatically disconnect said clutch and stop the work rotation.

15. A grinding machine comprising a rotatable grinding wheel and a work support which are movable relatively towards and from each other, an electrically controlled feeding mechanism to cause said relative movement, means including a work engaging caliper to control the feeding mechanism, a movable support for said caliper arranged to move said caliper into an operating position in engagement with the work, a timing device arranged to be latched by the initial movement of said caliper into an operative position, means including a switch actuated by the initial movement of the caliper to connect it to open the coolant fluid control valve, electrical connections between said switch and a clutch to automatically start the work rotation, and electrical connections between said caliper and timing device to automatically release the timing device when the work has been ground to a predetermined size to automatically remove the caliper from engagement with the work, said switch being arranged to automatically close the coolant fluid control valve and to disconnect the clutch and stop the work rotation.

16. A grinding machine comprising a rotatable grinding wheel and a work support which are movable relatively towards and from each other, means including a clutch to rotate the work, a solenoid to actuate said clutch in one direction, a feeding mechanism to cause the relative movement between the wheel and the work, a power mechanism including a clutch to actuate said feeding mechanism in either direction, a solenoid to actuate the power clutch, and an electrical control apparatus including a work engaging caliper and a timing control switch which are arranged so that movement of the caliper to an operative position successively deenergizes the solenoid to engage the first clutch and start the work rotation and energizes the solenoid to actuate the power clutch to start the infeed of the grinding wheel.

17. A grinding machine comprising a rotatable grinding wheel and a work support which are movable relatively towards and from each other, a coolant fluid system including a solenoid actuated valve to convey coolant fluid to the work and wheel, means including a solenoid actuated clutch to rotate the work, a feeding mechanism to cause the relative movement between the wheel and work, power mechanism including a forward feeding tumbler gear and a rearward feeding tumbler gear, a solenoid to actuate each of said tumbler gears, and an electrical control apparatus including a work engaging caliper and a solenoid actuated timing control having contact members which are arranged so that reduction in size of the work operates to deenergize a solenoid to stop the infeeding movement of the grinding wheel, to energize the solenoid in said time control switch to set the switch in motion, to remove the caliper from engagement with the work so as to open a circuit and thereby energize a solenoid to throw the reverse tumbler gear into mesh to cause a rearward movement of the grinding wheel, to energize a solenoid to disengage the clutch and stop the work rotation, to energize a solenoid and close the fluid valve to stop the flow of coolant fluid when the work has been reduced to a predetermined size.

18. A grinding machine comprising a base, a rotatable grinding wheel and a work support which are movable relatively towards and from each other, an electrically controlled feeding mechanism to cause said relative movement, means including a work engaging caliper to control the feeding mechanism, a timing device, means responsive to movement of the caliper to cause operation of the timing device, means responsive to the timing device which causes the caliper to be removed from contact with the work when the work has been ground to a predetermined size and means operative thereafter to move the caliper to a position remote from the work.

19. In combination with a grinding machine having a work support and a grinding wheel which are movable relatively toward and from each other and a reversible feeding mechanism to cause such movement and feed the wheel into the work, a calipering device having a movable feeler which moves with a reduction in the size of the work being ground, electrically operated means responsive to one position of said feeler while in engagement with the work during the grinding operation which is connected for stopping the forward feed of said mechanism and causing a dying-out grinding operation, means to move said caliper out of engagement with the work when the work has been ground to a predetermined size, and electrically operated means responsive to the movement of said caliper to an inoperative position when the work has been reduced further in size which causes the feeding mechanism to operate and withdraw the grinding wheel from contact with the work after the work has been ground to a further extent.

20. In combination with a grinding machine having a work support and a grinding wheel which are movable relatively toward and from each other and a feeding mechanism to cause such movement and feed the wheel into the work, a calipering device having a movable feeler which moves with a reduction in the size of the work being ground, electrically operated means responsive to one position of said feeler while in engagement with the work during the grinding operation which is connected for controlling the feeding mechanism, means to move said caliper out of engagement with the work when the work has been ground to a predetermined size, and electrically operated means to stop the grinding operation automatically after the work has been ground to a further extent.

21. A machine of the type covered by claim 20 having a timing device which stops the grinding action at a predetermined time after the caliper has been removed from contact with the work.

22. A machine of the type covered by claim 20 having a reversible wheel feeding mechanism and a delayed operation device which electrically controls the wheel feeding mechanism and causes a predetermined grinding operation after the caliper has been removed from the work and means controlled thereby which causes the feeding mechanism to be reversed and the wheel to be removed when the work has reached a desired size.

23. A grinding machine comprising a rotatable grinding wheel and a work support which are movable relatively towards and from each other to grind the work, a wheel feed mechanism, a calipering feeler removably engageable with the work, and an electrically operated device controlling the wheel feed mechanism which serves to cause a predetermined grinding operation after the feeler has been removed from contact with the work.

24. A grinding machine of the type covered by claim 23 comprising a reversible wheel feed mechanism and an electrically operated device responsive to movement of the feeler which serves to stop the infeed of the wheel when the work has reached a predetermined size and which causes the feed mechanism to reverse after the feeler has been removed from the work.

25. A grinding machine comprising a rotatable grinding wheel and a work support which are relatively movable to feed the wheel into the work, a power driven, automatically actuated wheel feeding mechanism connected to move the wheel either toward or away from the work at a continuous and uniform rate for an indefinite time, a gaging device having a feeler which contacts with the work and moves in response to a reduction in size of the work, mechanism responsive to the movement of said feeler to a predetermined position which causes said feeding mechanism to stop the infeed of the wheel into the work, means including a time delay device cooperating therewith which permits the wheel to remain in grinding contact with the work for a predetermined time after the grinding feed has been stopped, positively actuated means to actuate the feeding mechanism, and means responsive to said time delay device to positively control said positively actuated means and separate the wheel and work.

26. A grinding machine comprising a rotatable grinding wheel and a work support which are movable relatively to feed the wheel into the work, a wheel feeding mechanism connected to move the wheel either towards or away from the work at a continuous and uniform rate for an indefinite time until the work has been reduced to a predetermined size, a gaging device having a member which moves in response to a reduction in size of the work as it is being ground, a time delay device, means responsive to the movement of said member to a predetermined position indicating a definite work size which starts the time delay device into operation, means operated by said time delay device which causes the grinding operation to be stopped when a predetermined time interval has elapsed after said work size has been indicated, and an adjustable control device which accurately predetermines the period of dwell in grinding as caused by said time delay device.

27. A grinding machine comprising a rotatable grinding wheel and a work support which are movable relatively towards and from each other, a feeding mechanism to cause said relative approaching and receding movement therebetween, a gaging device having a single feeler continuously engaging the work and movable relative thereto in response to a reduction in size thereof, an electrically operated time delay device, electric control mechanism responsive to one position of said feeler to stop the relative feed of the wheel into the work and to start the operation of the time delay device, and an electrically controlled, positively actuated mechanism responsive to the operation of said delay device to positively control the feeding mechanism to separate the wheel and work when the wheel has remained in contact with the work for a predetermined time interval after the forward feed has been stopped.

28. A grinding machine comprising a rotatable grinding wheel and a work support which are relatively movable to feed the wheel into and away from the work, a feeding mechanism to cause said relative movement, a gaging device having a feeler which continuously contacts with the work and moves in response to a reduction in size thereof, mechanism responsive to the movement of said feeler to a predetermined position which causes said feeding mechanism to stop the infeed of the wheel into the work, and means including a time delay device which is actuated when said feeler reaches a second predetermined position to permit the wheel to remain in a dying-out grinding contact with the work for a predetermined time interval and then to reverse the feeding mechanism and stop the grinding operation.

29. A grinding machine comprising a rotatable grinding wheel and a work support which are movable relatively towards and from each other, a wheel feeding mechanism connected to move the wheel either towards or away from the work at a continuous and uniform rate for an indefinite time until the work has been reduced to a predetermined size, a gaging device having a movable feeler which moves with a reduction in the size of the work being ground, a low energy electric circuit responsive to one position of said feeler to regulate the forward feeding of said mechanism so as to change the rate of forward feed of the wheel into the work from a rough to a finish grinding, a time delay device and means including a second low energy circuit responsive to movement of the feeler to a second position which serves to control a high energy circuit to start the actuation of said time delay device, and means controlled by the time delay device which serves to stop the finish grinding and to separate the grinding wheel and work when the work has been reduced to a predetermined size.

30. A grinding machine comprising a rotatable grinding wheel and a work support which are movable relatively toward and from each other, a feeding mechanism to cause said relative movement, a gaging device having a feeler engageable with the work and movable with a reduction in size thereof, electrically operated means responsive to one position of said feeler to stop the forward feed of said mechanism, a timing device, and electrically operated means responsive to a second position of said feeler to actuate said timing device and thereafter reverse the feeding movement and cause a separation of the wheel and work.

31. A grinding machine comprising a rotatable grinding wheel and a work support which are movable relatively toward and from each other, a coolant fluid system including a valve to convey coolant fluid to the grinding wheel and work, power actuated feeding mechanism to cause said relative movement, means including a gaging device having a feeler which moves in response to a reduction in work size, means responsive to movement of the feeler to a predetermined position to stop the forward feeding movement of said mechanism, and means responsive to the movement of said feeler to a second position to close said valve and stop the flow of coolant fluid.

32. A grinding machine comprising a rotatable grinding wheel and a work support which are movable relatively toward and from each other, a coolant fluid system including a valve to convey coolant fluid to the grinding wheel and work, a power actuated feeding mechanism to cause said relative movement, means including a gaging device having a feeler which moves in response to a reduction in work size, means responsive to the movement of said feeler to a predetermined position to stop the forward feeding movement of said mechanism, electrically actuated means responsive to the movement of said feeler to close said valve and stop the flow of coolant fluid, and means responsive to the movement of said feeler which causes the feeding mechanism to be reversed after the forward feed has been stopped.

33. A grinding machine comprising a rotatable grinding wheel and a work support which are movable relatively toward and from each other, a coolant fluid system including a valve to convey coolant fluid to the grinding wheel and work, power actuated feeding mechanism to cause said relative movement, means including a gauging device having a feeler which moves in response to a reduction in work size, means responsive to movement of the feeler to a predetermined position to close the valve and stop the flow of coolant fluid, and means responsive to movement of said feeler to a predetermined position to stop the forward movement of said mechanism.

34. A grinding machine comprising a rotatable grinding wheel and a work support which are movable relatively toward and from each other, a coolant fluid system including a valve to convey coolant fluid to the grinding wheel and work, a power actuated feeding mechanism to cause said relative movement, means including a gauging device having a feeler which moves in response to a reduction in work size, means responsive to the movement of said feeler to a predetermined position to stop the forward feeding movement of said mechanism, and electrically actuated means responsive to movement of said feeler to a predetermined position to close said valve and stop the flow of coolant fluid.

35. A grinding machine comprising a rotatable grinding wheel and a work support which are movable relatively toward and from each other, a coolant fluid system including a valve to convey coolant fluid to the grinding wheel and work, a power actuated feeding mechanism to cause said relative movement, means including a gauging device having a feeler which moves in response to a reduction in work size, means responsive to movement of said feeler to a predetermined position to stop the forward feeding movement of said mechanism, means responsive to movement of said feeler to a predetermined position to close said valve and stop the flow of coolant fluid, and means responsive to movement of said feeler which causes the wheel to be removed from the work.

36. A grinding machine comprising a rotatable grinding wheel and a work support which are movable relatively toward and from each other, a coolant fluid system including a valve to convey coolant fluid to the grinding wheel and work, electrically controlled feeding mechanism to cause a relative approaching and receding movement between the wheel and the work, a work size controlling device having a feeler engageable with the work and movable with a reduction in size thereof, a low energy circuit responsive to movement of said feeler, means responsive to said low energy circuit which is effective to control the feeding mechanism, and means including a second low energy circuit responsive to movement of said feeler and a high energy circuit responsive thereto which is arranged to close said valve and stop the flow of coolant fluid when the feeler reaches a predetermined position.

37. A grinding machine comprising a rotatable grinding wheel and a work support which are movable relatively towards and from each other, a feeding mechanism to cause either an approaching or receding movement between the wheel and work support, an electrically actuated size controlling device having a feeler engageable with the work and movable with a reduction in the size thereof, means including an electrical circuit having a solenoid responsive to movement of said feeler to a predetermined position to change the rate of grinding the work, a time delay device, and means including a second electrical circuit directly connected with said time delay device and which is directly responsive to movement of said feeler to a second predetermined position to actuate the timing device and thereafter cause the feeding mechanism to separate the wheel and the work.

38. A grinding machine comprising a rotatable grinding wheel, a transversely movable wheel slide to support said wheel, a longitudinally movable work table to rotatably support a work piece in operative relation with the grinding wheel, a feeding mechanism operatively connected to move said grinding wheel slide toward or from the work support to produce the desired grinding action, a size controlling device having a feeler engageable with the work and movable with a reduction in size thereof, means including an electrical circuit having a solenoid which is responsive to movement of said feeler to a predetermined position to stop said feeding mechanism and thereby limit the forward movement of the grinding wheel, a time delay device, and means including an electrical circuit having a solenoid which is directly connected with the time delay device, said circuit being responsive to movement of said feeler to a second predetermined position to actuate the timing device and thereafter to reverse the feeding mechanism and cause said grinding wheel slide to move away from the work after a predetermined time interval has elapsed.

39. In combination with a grinding machine having a work support and a grinding wheel which are relatively movable toward and from each other to grind the work and an electrically controlled feeding mechanism to cause such movement, a size controlling device having a feeler engageable with the work, a low energy circuit including means whereby the flow of electrical energy therein is varied in response to movement of said feeler, means including a high energy circuit and an electrical device operatively connected to control the feeding mechanism to stop said feeding mechanism when the flow of electrical energy in the low energy circuit indicates a predetermined work size, an electrically controlled time delay device, and electrically operated mechanism to actuate said time delay device when the feeler has reached a second predetermined position and to cause a separation of the grinding wheel and work after a predetermined time interval has elapsed.

40. A grinding machine comprising a work support and a grinding wheel which are relatively movable to effect a grinding feed, an electrically controlled feeding mechanism to move the wheel either towards or away from the work, a calipering device having a feeler continuously engageable with the work and movable with a reduction in the size thereof, two low energy electric circuits, means including a set of contact elements which are relatively movable in response to movement of said feeler and a relay in each of said circuits, two secondary electric circuits each governed by one of said relays, means cooperating with one secondary circuit which acts upon effective movement of one relay by the feeler to terminate the grinding feed, an electrically actuated time delay device, and means cooperating with the other secondary circuit which serves, when the second relay is rendered effective by the feeler device, to actuate said time delay device and separate the grinding wheel and work support after a predetermined time interval has elapsed.

41. A grinding machine comprising a rotatable grinding wheel and a work support which are movable relatively toward and from each other, an electrically controlled feeding mechanism to cause said movement, a size controlling device including a feeler continuously engageable with the work and movable with a reduction in the size thereof, two low energy electrical circuits, means cooperating with one of said low energy circuits which is effective to change the grinding operation, a high energy electrical circuit having a time delay device, and means cooperating with the second low energy circuit which serves to control said high energy circuit to actuate the time delay device when the feeler reaches a second predetermined position to cause a separation of the grinding wheel and work support after a predetermined time interval has elapsed.

ALBERT G. BELDEN.
RAYMOND A. COLE.

CERTIFICATE OF CORRECTION.

Patent No. 2,003,334.

June 4, 1935.

ALBERT G. BELDEN, ET AL.

It is hereby certified that error appears in the printed specification of the above numbered patent requiring correction as follows: Page 6, first column, line 10-11, for "deenergize" read energize; and line 12, for "energize" read deenergize; and that the said Letters Patent should be read with these corrections therein that the same may conform to the record of the case in the Patent Office.

Signed and sealed this 5th day of November, A. D. 1935.

(Seal)

Leslie Frazer

Acting Commissioner of Patents.